United States Patent [19]

Zobel

[11] 3,911,408

[45] Oct. 7, 1975

[54] APPARATUS AND METHOD FOR CONTROLLING A COMMUNICATIONS TERMINAL

[75] Inventor: George C. Zobel, Pallatine, Ill.

[73] Assignee: Teletype Corporation, Skokie, Ill.

[22] Filed: Apr. 1, 1974

[21] Appl. No.: 457,026

[52] U.S. Cl. .............................................. 340/172.5

[51] Int. Cl.² .............................................. G06F 1/00

[58] Field of Search ............ 178/DIG. 22; 340/172.5

[56] References Cited

UNITED STATES PATENTS 3,566,361 2/1971 Lavertu ............................ 340/172.5

3,735,366 5/1973 Abrams ............................ 340/172.5

*Primary Examiner*—Ralph D. Blakeslee

*Attorney, Agent, or Firm*—W. K. Serp; J. L. Landis

[57] ABSTRACT

A control circuit for a communications terminal including means for selectively setting an inviolate margin having a width less than the line width of the display area. A random access memory is included having an extended bit level carrying protect attribute information related to its respective encoded word. Means are included which detect the presence of a protected line feed character in the memory. In response to the presence of a protected line feed character, the memory address is decremented to the address of the character preceding the location of the stored protected line feed character.

16 Claims, 2 Drawing Figures

APPARATUS AND METHOD FOR CONTROLLING A COMMUNICATIONS TERMINAL

BACKGROUND OF THE INVENTION

This invention generally relates to a control circuit for a communications terminal which provides a visual presentation of stored information and more particularly relates to such a control circuit which includes means for varying the maximum number of characters per line of displayed text by means of a selectively settable inviolate margin.

Information display communications terminals are widely used for the reception and transmission of encoded data. Such terminals generally receive and store data from an incoming line or keyboard and include means for the display, editing and readout of information from a memory in response to selected commands. Communications terminals often provide means for entering a prearranged form in the memory and displaying same on the display screen with certain portions thereof to be subsequently filled by the operator with appropriate data. The characters comprising the form are entered into the memory as protected words, that is, the operator is prevented, from accidentally overwriting such characters.

It is often desirable to preset the right hand margin of the text to conform with a form format or column tabulation; that is, to select a maximum line length less than the normal maximum horizontal line display capacity of the display screen of the cathode ray tube. To implement such an inviolate margin feature, prior terminals have frequently assigned an additional bit level to each word in the memory which level carries the margin information. It will be appreciated that the assignment of a distinct margin bit level to each memory word, in addition to the inclusion of a protect feature, greatly increases the size of the memory producing a corresponding increase in the cost and complexity of the terminal. Alternatively, prior terminals have assigned additional words to such margin information which increases the assigned word codes also resulting in a considerable increase in the required terminal memory size. With respect to the illustrated embodiment, means are included for providing an inviolate text margin without increasing the memory capacity of the terminal.

SUMMARY OF THE INVENTION

An apparatus for controlling the operation of a communications terminal which serves to manipulate and display encoded data. Encoded information is stored in a selectively addressable random access memory having preselected read and write operational modes. Each address location of the memory provides a multilevel word and an associated extended protect level which carries the protect attribute of a corresponding word. The apparatus additionally includes means for inhibiting the write mode of the memory when the memory is addressed to a word location having a protect attribute as indicated by a signal at the associated protect level so that protected information is retained in unaltered form.

Means are included for analyzing the characteristics of a selected word from the memory and providing a protected line feed signal in response to an encoded line feed word coincident with a protected level signal. Additionally, means are included for altering the address of the memory in response to a protected line feed signal.

Correspondingly, it is a main purpose of this invention to provide a communications display terminal having an improved means for presetting an inviolate margin of the stored text. Other objects, advantages and features of the invention will appear from the following detailed description of a specific embodiment thereof when taken in conjunction with the appended drawings.

DETAILED DESCRIPTION

Memory Control

Particular reference is made to U.S. Pat. Application Ser. No. 437,257, entitled "Apparatus And Method For Controlling A Communications Terminal," filed Jan. 28, 1974, by K. W. Turner and G. C. Zobel, wherein certain of the components subsequently described are considered in greater detail; said application being incorporated herein by reference.

Figure 1:
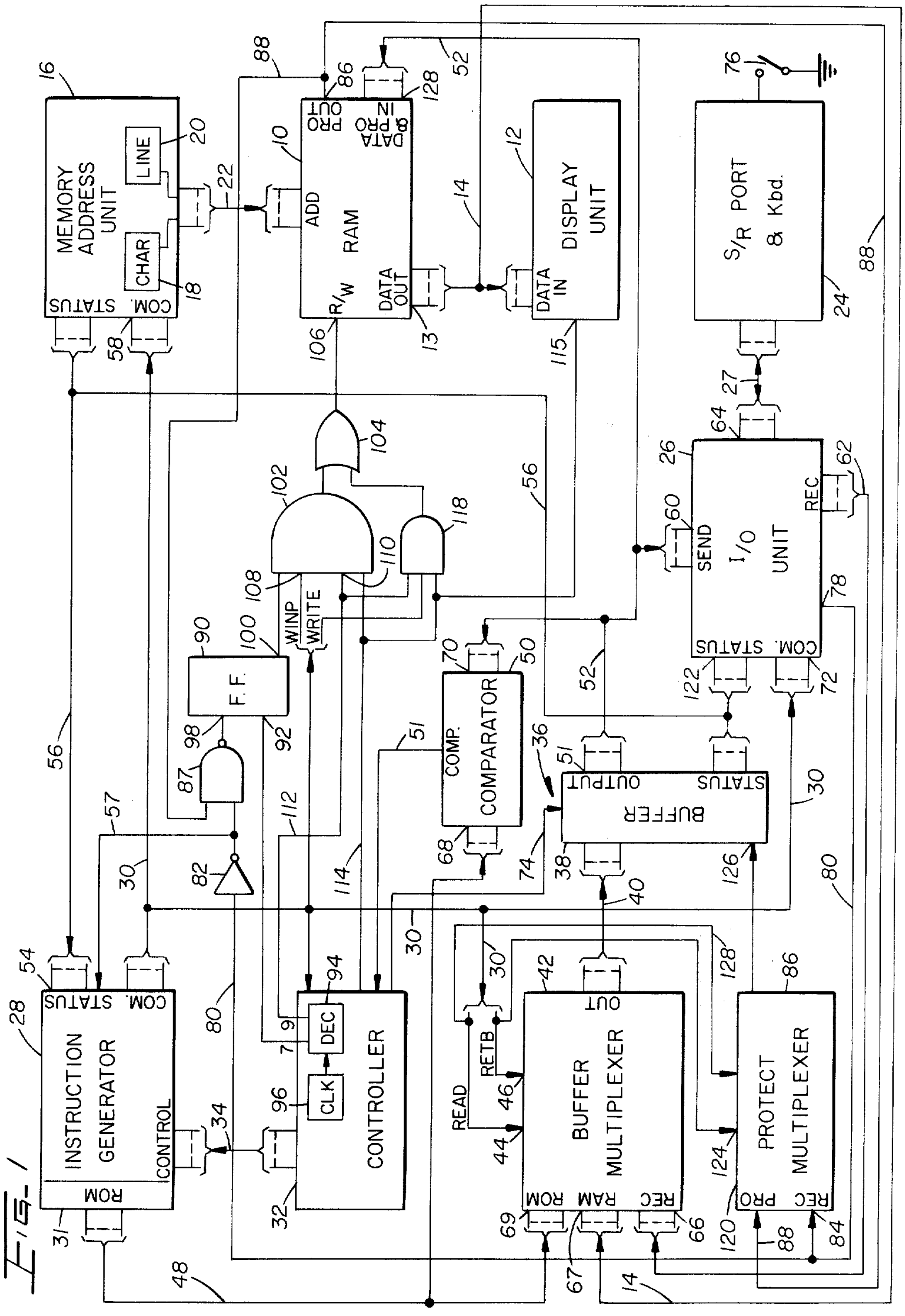
FIG. 1 is a schematic diagram of a control circuit for a communications terminal including certain features of this invention.

With respect to FIG. 1, incoming information is stored in a random access memory (RAM) 10 which, during periodic portions of an operational cycle, serves to refresh a display unit 12 with encoded characters provided at data output 13 via a data output bus 14. As will be further considered, the memory 10 functions on a "read modified write" cycle. That is, after a selected location is accessed, a read signal preceeds the write signal. Serving to address the RAM 10 to the desired edit location is a memory address unit 16 containing both character 18 and line 20 address sections fed to the RAM 10 by an address bus 22. The data stored in the memory 10 is continuously edited and updated and during a preselected portion of each operational cycle, the RAM 10 supplies data to the cathode ray tube display unit 12.

Serving to interface the control circuitry with an external signal source such as an operator keyboard or incoming line send/receive port 24 is an incoming-outgoing (I/O) unit 26 connected to the S/R port via an I/O bus 27. All incoming and outgoing information is passed through the I/O unit 26 and is routed therefrom in response to command instructions from an instruction generator 28 via a multilevel command bus 30. The instruction generator 28 serves to sequentially direct the operation of the terminal as determined by a read only memory (ROM) 31 in response to control signals from a controller 32 fed via a control bus 34. Data words read into the RAM from the I/O unit 26 and data sent from the RAM 10 through the S/R port are passed through a buffering means 36 whereat the words are analyzed for the purpose of determining the presence of selected character attributes such as the presence of a "protect" bit level. The buffering means 36 includes a buffer 38 fed via a multiconductor bus 40 from a 3 to 1 buffer multiplexer 42 controlled by command signals from the instruction generator command bus 30. The command bus 30 supplies Read and Receive to Buffer (RETB) signals to the multiplexer 42 via ports 44 and 46 of the multiplexer 42. The multiplexer 42 switches a multilevel output between the output of the I/O unit 26 and the RAM 10. The absence of either READ or RETB signals causes the output of the multiplexer 42 to switch to the ROM 31 output of the instruction generator connected via a bus 48.

Additionally, the control circuit includes a data comparator 50 which serves to selectively compare the information stored in the buffer 38 fed via bus 52 with the ROM 31 output from the instruction generator 28 fed via bus 48 for purpose of analyzing the characteristics of incoming and outgoing code groups. A comparison signal is fed from the comparator 50 to the controller 32 via line 51 which, in turn, directs the operational sequence of the control circuit as further described in the cited Turner et al. reference. As mentioned, the instruction generator 28 includes the preprogrammed read only memory 31 which determines the operational sequence of the terminal. The generator 28 provides a multilevel status input 54 serving to execute a selective status check of the operational condition of selected components of the apparatus via a status bus 56, and the presence of a form enter mode signal on line 57 as will be subsequently described.

As mentioned, the instruction generator 28 supplies command instructions via bus 30. The command bus 30 is connected to one multilevel input 58 of the memory address unit 16 and serves to direct the word address of the memory 10. Outgoing data is fed from the buffer 38 to a multilevel send port 60 of the I/O unit 26 whereas incoming data from the send/receive port 24 is fed via bus 62 from the I/O unit 26 and to the receive (Rec) input 66 of the buffer multiplexer 42. A multilevel receive input 67 of the buffer multiplexer 42 designated RAM is fed by the data output 13 of the RAM 10 which, also feeds the display unit 12 for visual display of the text stored in the RAM 10. One input 68 of the comparator 50 is fed by the ROM output of the instruction generator 28 which also feeds a multilever ROM input 69 of the buffer multiplexer 42. The remaining comparator input 70, is fed by the output of the buffer 38 via bus 52. In response to a coincidence between the ROM word output of the instruction generator 28 and the output of the buffer 38, a coincidence signal is fed via line 51 to the controller 32 which, in turn, directs the ROM 31 of the instruction generator 28 to the next address.

An incoming word from the S/R port 24 passes through the I/O unit 26 and is present at the receive input 66 of the buffer multiplexer 42. Periodically, upon command from the instruction generator 28, the status of the I/O unit 26 is checked via the status bus 56 at I/O status port 122. In response to an affirmative incoming code determination, the instruction generator 28 issues an RETB command. The multiplexer 42, in response to the RETB signal, at port 46, from the command bus 30 switches the incoming code to the input of the buffer 38. In response to a load signal via line 74 from the controller 32, the buffer 38 loads with the output of the buffer multiplexer 42 and this code word is now present at the output port 51 of the buffer. The buffer output signal is compared with the ROM 31 output of the instruction generator 28 for purposes of determining the presence of any character attributes and the character word is written into the RAM 10. Similarly, during RAM readout, data is taken from the data output 13 of the RAM 10 and is switched by the buffer multiplexer 42 to the buffer 38 and compared in the comparator 50 with the ROM 31 output of the instruction generator 28. The multilevel code from the buffer 38 is fed to the input of the I/O unit 26 and sent through the send/receive port 24.

Character Protect

Serving to condition the terminal for receipt of a protected form, a form enter switch 76 is provided upon the keyboard which, when actuated, places a bit in the protect level of each subsequent code word sent from the keyboard to the I/O unit 26. The protect bit level for each word passes from the S/R port 24 to the I/O unit and is present at a form enter mode port 78 of the I/O unit and fed via line 80 to the input of a form enter mode inverter 82 and the receive input 84 of a protect bit level multiplexer 86. Prior to using the protected format, the operator closes the form enter switch 76, placing a low level signal at the form enter mode output 78 of the I/O unit 26. This low signal is coupled to the input of the form enter mode inverter 82, producing a high level at the inverter 82 output which is fed to the input of a dual input protect NAND-gate 87 and to the protect status input of the instruction generator via line 57. Serving to force the NAND-gate 87 output low when a protect word is read from the RAM, the alternate input of the gate is connected to a protect level output 86 of the RAM 10 via line 88. During the read portion of the read modified write cycle of the RAM 10, the protect output 86 selectively may go high thereby preventing the writing of a new word code at the addressed location as will be subsequently further considered. Serving as a protect bit memory is a flip-flop 90. The toggle input 90 of the protect flip-flop 90 is fed by the count seven output of a decoder 94 which is driven by a system clock 96 forming part of the controller. The signal level at the steering input 98 of the flip-flop 90, which is the output of the NAND-gate 87 is transferred to the flip-flop output 100 upon the seventh count of the decoder 94. The flip-flop 90 output 100 is fed to one input of a quad input AND-gate 102, the output of which is fed through an OR-gate 104 to a read/write input 106 of the RAM 10. One input 108 of the AND-gate is fed by a write if not protect (WINP) command signal from the instruction generator 28 via command bus 30 and a third input 110 is fed by the count nine output of the controller decoder 94 via line 112 which is the decoder sequencing write signal.

Serving to inhibit the RAM write mode during display-refresh of the RAM 10, a display cycle control signal from the controller 32 is fed to the remaining AND-gate input via line 114. It will be appreciated that the output of the quad AND-gate 102 places the RAM 10 in the write mode when four conditions occur; namely, the absence of a display cycle signal (line 114), the occurrence of a decoder 94 count nine pulse, a write if unprotected command (input 108) and the condition that flip-flop 90 output 100 is high. The output 100 of flip-flop 90 will be low when the form enter mode is off, line 80 low, and the location to be written in the RAM contains a protected character, that is, the presence of a high signal via line 88. The count nine pulse from the decoder 94 is also fed to one input of a triple input AND-gate 118, and the display cycle signal via line 114 is fed to the remaining input of the triple input AND-gate and to a display input 115 of the display unit 12 serving to enable the display unit during the display cycle. The output of the AND-gate 118 is fed to the remaining input of the OR-gate 104 and upon a coincidence high signal to all of the three inputs of the AND-gate 118 the RAM 10 is placed in an unconditional write mode by applying a high signal to RAM 10 read-write input 106.

For purposes of discussion it will be assumed that the form enter mode is off, line 80 low, and the word at the RAM 10 address location includes a protect bit in the protect level. The protect bit from the RAM is inverted by the protect NAND-gate 87 causing a low at the steering input 98 of the protect flip-flop 90. Upon the occurrence of count seven from the decoder 94, the steering input is transferred to the flip-flop 90 output 100 placing a low signal at one input of the quad input AND-gate 102. When the count nine pulse from the decoder 94 arrives at the AND-gate 102, the RAM 10 is maintained in the read mode due to a low at the RAM read/write input 106 and the new character present at the data input 128 is not written in the RAM 10 over the previously stored protected word. In this manner, the operator is prevented from writing over any stored protected characters. The protect bit level output from the RAM is also sent via line 88 to the remaining input 120 of the 2-1 protect multiplexer 86.

Margin Set

Figure 2:
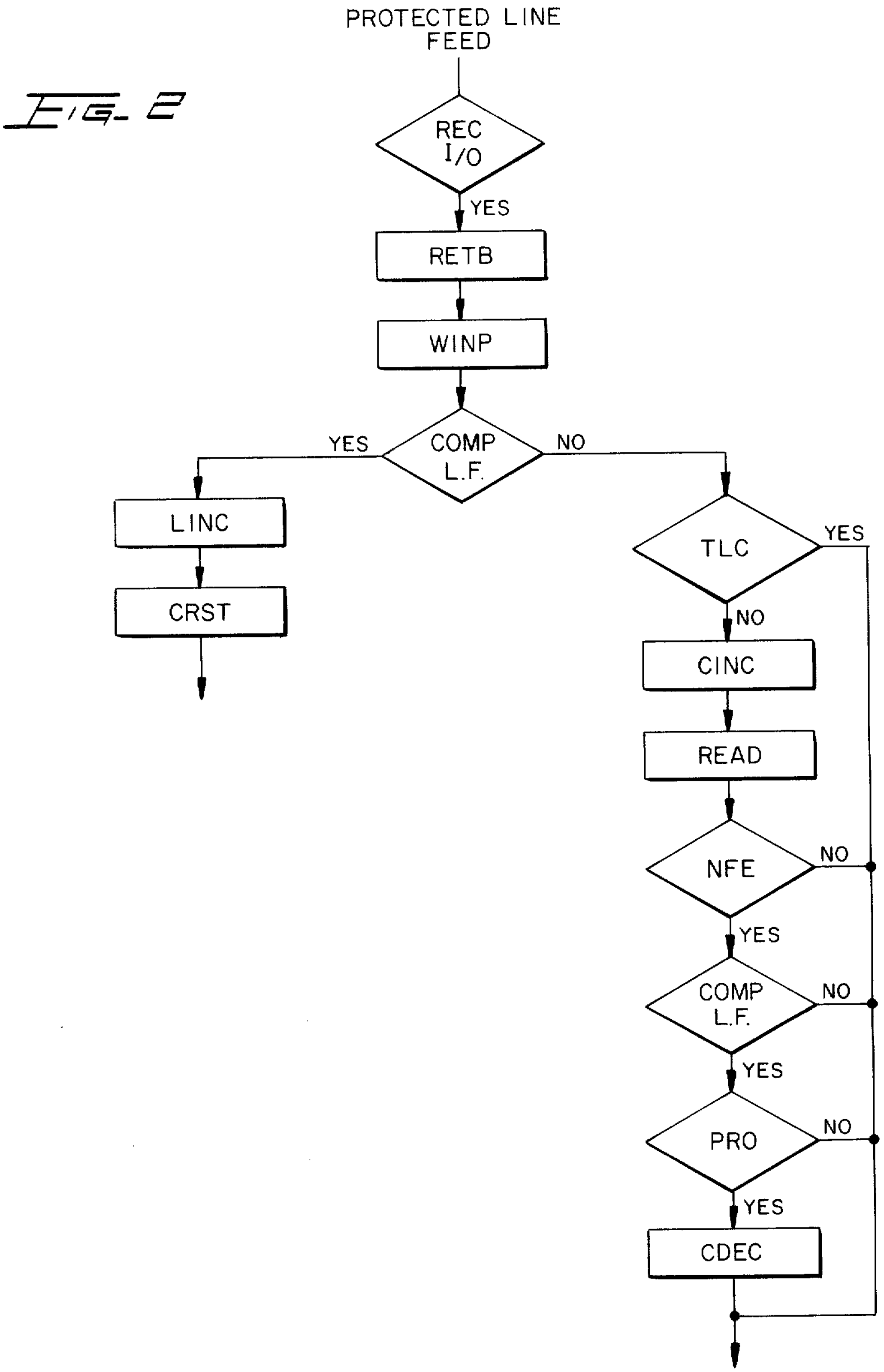
FIG. 2 is a logic flow diagram illustrating an operational sequence of the apparatus of FIG. 1.

The inviolate margin feature is obtained by writing a protected line feed into the RAM 10 at a selected location. This operational feature is more clearly understood with reference to the flow diagram of FIG. 2. During each operational cycle, the instruction generator 28 checks the status of receive port 122 (Rec I/O) of the I/O unit 26 to ascertain the presence of an incoming character. In response to an affirmative determination, the instruction generator 28 sends a Receive to Buffer (RETB) command to port 46 of the buffer multiplexer and port 124 of the protect multiplexer switching the incoming signal from the I/O unit 26 to the buffer. In response to a load signal from the controller 32 via line 74, the buffer 38 loads with the output of the multiplexers 42 and 86 and the character word including the extended bit level is present at the data input 128 of the RAM via bus 52. Thereafter, the instruction generator 28 sends a write if not protect signal (WINP) to AND-gate 102. If the RAM 10 word at the address location is protected, the protect output 88 will be high and this high signal fed to the NAND-gate 87 which will couple a low to flip-flop 90 input 98. When the form enter mode is off and line 80 low, count seven of the decoder 94 causes the low output of the flip-flop to be transferred to the input of the AND-gate 102 holding the RAM 10 in the read mode of operation.

Subsequently, the instruction generator 28 initiates a status check (Comp L. F.) to ascertain whether the character at the buffer 38 is a line feed code by comparing the buffer character with a line feed code from the ROM 31 output of the instruction generator 28 in the comparator 50. In response to an affirmative determination, the instruction generator 28 commands the memory address unit 16 to line increment (LINC) and character reset (CRST), and the RAM 10 is addressed to the first character position of the next line. If the status check produces a negative determination, that is, the word in buffer 38 is not a line feed, the alternate branch of the flow diagram is selected.

In response to a negative line feed determination, the instruction generator 28 checks (TLC) the status of the memory address unit 16 to determine if the RAM 10 address is that of the last character of a conventional length line. This last character status check (TLC) is performed by checking the address of the character address section 18 of the memory address unit. An affirmative determination is conclusive and in response to a negative determination, the character section 18 of the memory address unit 16 is instructed to character increment (CINC) the RAM 10 to the next address location and this word is then present at the data 13 and protect 86 outputs of the RAM 10. In response to a READ command from the instruction generator 28, which is sent to port 44 of the buffer multiplexer 42 and to the protect multiplexer 86 via line 128, the buffer multiplexer 42 and the protect multiplexer 86 switches their outputs 86 and 13 to the buffer 38 and line 74 loads the buffer with the RAM word. A status check (NFE) is initiated via line 57 for the purpose of determining the operative condition of the form enter switch 76. If the form enter mode is ON, the determination is conclusive whereas a negative determination initiates the next status check. The instruction generator 28 then checks the status (Comp L. F.) of the output of the RAM 10 to ascertain whether the output word from the RAM 10 is a line feed character. This status check (Comp L. F.) is accomplished by comparing the output of buffer 38 with a line feed character code from the instruction generator 28 in the comparator 50. A negative determination terminates further analysis and in response to a positive status check the instruction generator 28 checks the (PRO) protect output 86 of the RAM 10, which is also in buffer 38, to determine whether the word contains a bit in the protect level. In response to an affirmative determination, the memory address unit 16 is instructed by the instruction generator 28 to decrement (CDEC) the character address section 18, returning the memory address unit 16 to the address of the last word written into the RAM 10.

It will be appreciated that a protected line feed word stored in the RAM 10 prevents the memory address unit 16 from advancing and therefore serves as an inviolate margin indication. In this way the control circuit responds to the character before a protected line feed as if it were the last character on the line. As previously mentioned, when a protected word is addressed at a RAM 10 location, a high signal at the protect data output 86 prevents the writing of a new word at that address when the form enter mode is off. Without increasing the number of code words or the bit level of the memory 10, an inviolate margin feature has been obtained by combining a protect bit level with a line feed word. The operator selectively sets the desired margin width by entering a protected line feed word into the memory 10 at the end of a selected text line. Each time a new character word is written into the RAM 10, the memory address unit 16 is incremented one character location and the new address is checked by the instruction generator 28 to determine the presence of a protected line feed word. An affirmative response decrements the memory address unit 16 back to its previous position thus preventing violation of the protected margin.

Although this invention has been particularly shown and described with reference to a preferred embodiment thereof, it will be understood that various changes in form and detail may be made without departing from the scope and spirit of the invention.

What is claimed is:

1. An apparatus for controlling the operation of a communications terminal which serves to manipulate encoded character data comprising:

a selectively addressable random access memory having selected read and write operational modes;

means for addressing said memory to a selected address;

each address location of said memory providing a multilevel word and an extended protect level associated with the selected word carrying the protect attribute of the encoded character; and means for inhibiting the write mode of said memory when said memory is addressed to a word location having a protect attribute as indicated by the signal level of said corresponding extended protect level so that protected information stored in said memory is retained in unaltered form.

2. The apparatus of claim 1 which further includes: means for analyzing the characteristics of a selected word from said memory and providing a protected line feed signal in response to an encoded line feed character coincidence with an extended level protect signal and means for altering the address of said address means in response to said protected line feed signal.

3. The apparatus of claim 2 wherein the data stored in said memory is arranged in lines each having a plurality of characters, said memory address unit including means for addressing said memory with respect to a selected line and means for addressing said memory with respect to a selected character in the line; and said protected line feed signal serving to decrement said character address means thereby preventing the advance of said character address means beyond the character position before said protected line feed character.

4. The apparatus of claim 1 which further includes: means for analyzing the characteristics of a selectively addressed word from said memory and providing a first signal in response to a preselected word coincident with an extended level protect signal and means for inhibiting the advance of said address means beyond the address of said preselected word in response to said first signal.

5. The apparatus of claim 4 wherein said memory address unit includes means for addressing said memory with respect to a selected line and means for addressing said memory with respect to a selected character in the line; and said first signal decrementing said character address means thereby preventing the advance of said character address means beyond the line position of said preselected character.

6. A control circuit for a communications terminal which serves to manipulate encoded data comprising:

a selectively addressable random access memory having selectable read and write operational modes;

means for addressing said memory to a selected address;

each address location of said memory providing a multilevel word and an extended protect level associated with the selected word carrying the protect attribute of the encoded character;

an instruction generator providing a plurality of sequential instructions; and gating means for controlling the operative mode of said memory and responsive to selected instructional signals from said instruction generator and to the protect level output of said memory.

7. The apparatus of claim 6 wherein said instruction generator selectively provides a write if not protected command to said gating means at a selected memory address location, said protect output of said memory means being fed to said gating means so that upon the coincidence of a protect signal and said write if not protected command, said memory means is retained in said read operational mode.

8. The apparatus of claim 7 which further includes sequencing means providing a first control signal and a subsequent second control signal, a second memory responsive to the protect level output from said random access memory and said first control signal for retaining the condition of said protect level output throughout an entire sequence, said second memory and said write if not protect signal inhibiting said gating means in the presence of said second control signal.

9. The apparatus of claim 7 which further includes second gating means responsive to a write command from said instruction generator and serving to place said RAM in said write mode during a selected portion of an operational cycle irrespective of the level of said protect signal from said extended memory level.

10. The apparatus of claim 8 which further includes second gating means responsive to a write command from said instruction generator and serving to place said RAM in said write mode during a selected portion of an operational cycle irrespective of the level of said protect signal from said extended memory level.

11. The apparatus of claim 1 which further comprises:

selectively actuable means for disabling said inhibiting means for entering a protected word into said memory at a memory address location containing a previously stored protected word.

12. A method for controlling the operation of a communications terminal which serves to manipulate encoded character data wherein a selectively addressable random access memory having selected read and write operational modes is included comprising the steps of:

addressing said memory to a selected address location;

checking said addressed location to determine whether the location contains a protected word;

instructing said memory to write a selected word at the addressed location; and inhibiting said write instruction when said address location contains a protected word.

13. The method of claim 12 which further comprises the steps of:

analyzing the characteristics of the memory word at the addressed location;

altering the address of said memory in response to the presence of a selected memory word which is also protected.

14. The method of claim 13 wherein said memory address is altered in response to a selected, protected memory word by decrementing the character address of said memory.

15. The method of claim 12 which further comprises the steps of:

analyzing the characteristics of the memory word at the addressed location to determine the presence of a selected word; and inhibiting the advance of the memory address beyond the address of the selected word.

16. The method of claim 12 wherein said address location is checked to determine the presence of a protected, line feed word; and inhibiting the advance of the memory address beyond the address of the protected line feed word.

* * * * *